US008513513B2

(12) United States Patent
Komano

(10) Patent No.: US 8,513,513 B2
(45) Date of Patent: Aug. 20, 2013

(54) ELECTRONIC MUSICAL INSTRUMENT, METHOD, AND STORAGE MEDIUM STORING A COMPUTER PROGRAM THAT ALLOW EDITING OF DRUM TONE COLOR IN DRUM KIT

(75) Inventor: Takeshi Komano, Iwata (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 13/178,566

(22) Filed: Jul. 8, 2011

(65) Prior Publication Data

US 2012/0006182 A1 Jan. 12, 2012

(30) Foreign Application Priority Data

Jul. 9, 2010 (JP) ................................ 2010-156996

(51) Int. Cl.
*G01H 1/00* (2006.01)
*G01H 1/18* (2006.01)

(52) U.S. Cl.
USPC .................. 84/615; 84/601; 84/602; 84/609; 84/611; 84/616; 84/649; 84/651; 84/653; 84/654; 84/735; 84/104

(58) Field of Classification Search
None
See application file for complete search history.

(56) References Cited

U.S. PATENT DOCUMENTS

| | | | | |
|---|---|---|---|---|
| 4,872,385 | A | 10/1989 | Oguri et al. | |
| 5,920,025 | A * | 7/1999 | Itoh et al. | 84/611 |
| 7,323,630 | B2 * | 1/2008 | Tsuge et al. | 84/609 |
| 7,968,787 | B2 * | 6/2011 | Ueki | 84/626 |
| 2008/0072742 | A1 | 3/2008 | Nishida | |
| 2010/0083814 | A1 | 4/2010 | Kira | |

FOREIGN PATENT DOCUMENTS

JP HEI-10-254439 A 9/1998

OTHER PUBLICATIONS

Yamaha; Digital Workstation TYROS3 Owner's Manual; U.R.G., Pro Audio & Digital Musical Instrument Division, Yamaha Corporation; 2008 Yamaha Corporation; pp. 1-121.

Extended European Search Report issued in European counterpart application No. EP 11173011.5, dated Jan. 15, 2013.

* cited by examiner

*Primary Examiner* — Marlon Fletcher

(74) *Attorney, Agent, or Firm* — Rossi, Kimms & McDowell LLP

(57) ABSTRACT

During reproduction of drum-part performance tones with a predetermined performance pattern, comprising a combination of a plurality of drum tone colors, based on automatic performance style data including at least performance pattern data associated with a drum kit defining a combination of the plurality of drum tone colors, a drum kit editing section replaces any one or more of the drum tone colors, defined in the drum kit, with one or more other drum tone colors. Thus, even during an automatic accompaniment, a user can readily replace any one or more of the drum tone colors, defined in the drum kit allocated to the drum part, with one or more other drum tone colors while promptly checking an automatic accompaniment having the other drum tone colors reflected therein.

12 Claims, 8 Drawing Sheets

| TONE COLOR WAVEFORM NAME | NOTE | DRUM KIT NAME |
|---|---|---|
| TONE COLOR WAVEFORM 1 | F#1 | DRUM KIT A |
| TONE COLOR WAVEFORM 2 | F#1 | DRUM KIT B |
| TONE COLOR WAVEFORM 3 | F#1 | DRUM KIT C |
| TONE COLOR WAVEFORM 4 | F#1 | DRUM KIT D |
| TONE COLOR WAVEFORM 5 | F#1 | DRUM KIT E |
| TONE COLOR WAVEFORM 6 | F#1 | DRUM KIT F |
| TONE COLOR WAVEFORM 7 | F#1 | DRUM KIT G |
| TONE COLOR WAVEFORM 8 | F#1 | DRUM KIT H |
| TONE COLOR WAVEFORM 9 | A♭1 | DRUM KIT I |

ELECTRONIC MUSICAL INSTRUMENT, METHOD, AND STORAGE MEDIUM STORING A COMPUTER PROGRAM THAT ALLOW EDITING OF DRUM TONE COLOR IN DRUM KIT

BACKGROUND

The present invention relates to an electronic music apparatus for automatically executing an accompaniment performance on the basis of automatic accompaniment style data. More particularly, the present invention relates to a technique for individually replacing any one or more of a plurality of drum tone colors, defined in a drum kit allocated to a drum part, with one or more other drum tone colors during an automatic accompaniment.

Heretofore, there have been known electronic music apparatus, such as electronic musical instruments, which are capable of, on the basis of automatic accompaniment style data (hereinafter referred to simply as "style data") automatically reproducing an accompaniment performance with a performance pattern predetermined for each of a plurality of channels (corresponding to performance parts). For an automatic performance of a drum part (also called "rhythm part") in such electronic music apparatus, any one of drum kits pre-defining combinations of drum tone colors is selectively allocated to the drum part (channel). In this manner, a plurality of drum tone colors can be collectively replaced with one or more other drum tone colors irrespective of whether or not an automatic accompaniment is currently being executed, i.e. irrespective of whether or not style data are currently being reproduced. One example of such electronic music apparatus is disclosed in "DIGITAL WORKSTATION Tyros3 Owner's Manual", 2008, Yamaha Corporation, available from the Internet at http://www2.yamaha.co.jp/manual/pdf/emi/english/port/tyros3en_om_c0.pdf.

Further, Japanese Patent Application Laid-open Publication No. HEI-10-254439 (corresponding to U.S. Pat. No. 5,920,025 and will be referred to as "Patent Literature 1") discloses creating modifying data called "tweak style data" for modifying accompaniment style data to create modified or new accompaniment style data such that the new accompaniment style data, having been modified on the basis of the tweak style data, can be reproduced and stored as custom style data. The tweak style data includes a "drum replacing parameter" such that a desired drum tone color of a drum part in the accompaniment style data can be replaced with another drum tone color. However, the technique disclosed in Patent Literature 1 cannot edit a drum kit.

Further, the conventionally-known electronic music apparatus have a so-called drum kit editing function that allows any one or more of a plurality of drum tone colors, defined in a drum kit, to be individually replaced with one or more other drum tone colors.

With the aforementioned drum kit editing function, however, the drum kit editing, i.e. replacement of individual drum tone colors, can be performed only prior to the start of an automatic accompaniment, i.e. only during stoppage of reproduction of the style data. Thus, it has been conventional to create in advance, i.e. prior to the start of an automatic accompaniment, a drum kit having one or more desired drum tone colors replaced with other drum tone colors in accordance with the drum kit editing function and then select the created drum kit during the automatic accompaniment to thereby reflect the other drum tone colors in the automatic accompaniment.

However, the aforementioned is nothing but collective drum tone color replacement based on the drum kit created prior to the start of an automatic accompaniment in accordance with the drum kit editing function. Therefore, it is not possible to promptly check the automatic accompaniment having the other drum tone colors reflected therein, which would undesirably lead to poor usability of the apparatus. Therefore, there has been a demand for an apparatus which can individually replace any one or more of a plurality of drum tone colors, defined in a drum kit, with one or more other drum tone colors even during an automatic accompaniment and allows a user to promptly check the automatic accompaniment having the other drum tone colors reflected therein. But, no such apparatus has been proposed to date.

SUMMARY OF THE INVENTION

In view of the foregoing, it is an object of the present invention to provide an improved electronic music apparatus which can individually replace any one or more of a plurality of drum tone colors, defined in a drum kit allocated to a drum part, with one or more other drum tone colors during an automatic accompaniment.

In order to accomplish the above-mentioned object, the present invention provides an improved electronic music apparatus, which comprises: a storage section which stores therein a drum kit defining a combination of a plurality of drum tone colors; a tone reproduction section which, on the basis of automatic performance style data including at least performance pattern data associated with the drum kit, reproducing performance tones of a drum part with a performance pattern comprising a combination of the plurality of drum tone colors; and a drum kit editing section which, during reproduction of the performance tones of the drum part and in response to operation by a user, replaces at least one of the plurality of drum tone colors defined in the drum kit with another drum tone color waveform.

According to the present invention, during reproduction of performance tones of the drum part with a performance pattern (which comprises a combination of a plurality of drum tone colors) based on automatic performance style data including at least performance pattern data associated with a drum kit defining a combination of the plurality of drum tone colors, the drum kit editing section replaces any one or more of the plurality of drum tone colors, defined in the drum kit, with one or more other drum tone colors. Thus, even during an automatic accompaniment, the user can readily replace any one or more of the plurality of drum tone colors, defined in the drum kit allocated to the drum part, with one or more other drum tone colors while promptly checking an automatic accompaniment having the other drum tone colors reflected therein. Therefore, the electronic music apparatus of the present invention can achieve an enhanced convenience.

The present invention may be constructed and implemented not only as the apparatus invention as discussed above but also as a method invention. Also, the present invention may be arranged and implemented as a software program for execution by a processor such as a computer or DSP, as well as a storage medium storing such a software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
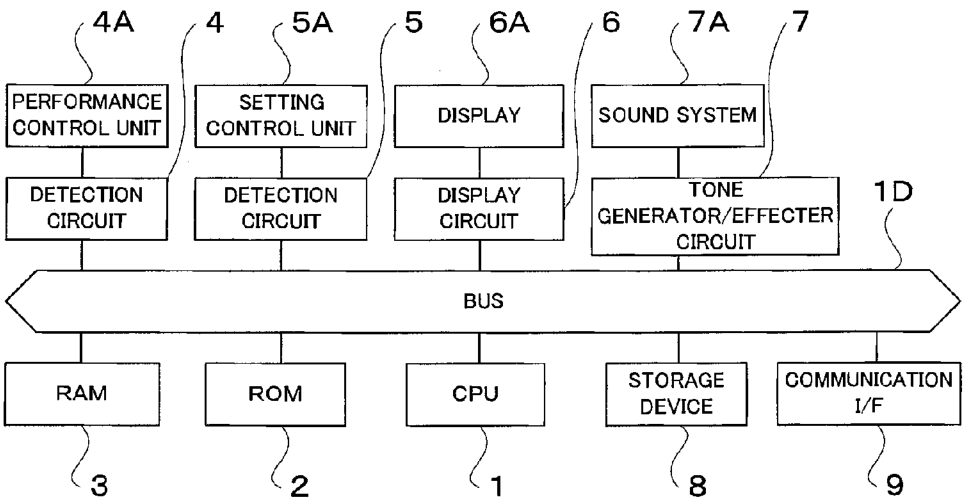
FIG. 1 is a block diagram showing an example of a general hardware setup of an electronic music apparatus in accordance with an embodiment of the present invention.

FIG. 1 is a block diagram showing an example of a general hardware setup of an electronic music apparatus in accordance with an embodiment of the present invention. The electronic music apparatus of FIG. 1 is, for example, an electronic musical instrument equipped with an automatic accompaniment function capable of performing an automatic accompaniment at least on the basis of automatic accompaniment style data prepared in advance, and this electronic music apparatus is controlled by a microcomputer including a microprocessor unit (CPU) 1, a read-only memory (ROM) 2 and a random access memory (RAM) 3. The CPU 1 controls operation of the entire electronic music apparatus. To the CPU 1 are connected, via a data and address bus 1D, the ROM 2, RAM 3, detection circuits 4 and 5, display circuit 6, tone generator/effect circuit 7, storage device 8 and communication interface (IF) 9.

The ROM 2 stores therein various programs for execution by the CPU 1 and various data for reference by the CPU 1. The RAM 3 is used as a working memory for temporarily storing various data generated as the CPU 1 executes predetermined programs, as a memory for temporarily storing a currently-executed program and data related to the currently-executed program, and for various other purposes. Predetermined address regions of the RAM 3 are allocated to various functions and used as various registers, flags, tables, temporary memories, etc.

A performance control unit 4A is, for example, a keyboard including a plurality of keys operable to select pitches of tones to be generated and key switches provided in corresponding relation to the keys. The performance control unit (e.g., keyboard) 4A can be used not only for a manual performance by a user, but also as means for selecting style data, drum kit and waveform data and means for instructing a reproduction start/stop of an automatic accompaniment. The detection circuit 4 detects depression and release of keys of the performance control unit 4A to thereby produce detection outputs.

A setting control unit 5A includes, for example, reproduction start/stop buttons for instructing a reproduction start/stop of an automatic accompaniment, one or more general-purpose buttons which are disposed around a display 6A and whose functions are changeable in such a manner as to achieve control corresponding to content displayed at predetermined positions on various screens displayed on the display 6A (as will be later detailed with reference to FIGS. 10 to 15), and various controls, such as switches, for making various settings (of parameters) related to tone control. In addition to the aforementioned, the setting control unit 5A may also include a numeric keypad for inputting numeric value data for selecting, setting and controlling a tone pitch, color, effect, etc., a keyboard for inputting characters and letters, and various other controls. The detection circuit 5 detects operating states of the setting control unit 5A and outputs switch information, corresponding to the detected operating states, etc. to the CPU 1 via the data and address bus 1D.

The display circuit 6 displays, on the display 6A that is in the form of a liquid crystal display (LCD) panel, CRT or the like, not only various screens to be later described with reference to FIGS. 10 to 15, but also setting states of various settings (parameters) related to tone control, various data currently stored in the ROM 2 and storage device 8, controlling state of the CPU 1, etc. As an alternative, the display 6A may be in the form of a touch-sensitive panel, in which case the electronic music apparatus, of course, includes a detection function for detecting (identifying) user's touch operation performed on a display screen; in such a case, the above-mentioned general-purpose buttons may be dispensed with.

The tone generator/effect circuit 7, which is capable of simultaneously generating tone signals in a plurality of tone generation channels, receives not only performance information generated in response to user's manual operation on the performance control unit 4A and performance information generated on the basis of performance pattern data of individual performance parts included in style data but also waveform data of individual ones of various tone colors prestored in a memory, and generates tone signals on the basis of the received performance information and waveform data. The tone generator/effecter circuit 7 also imparts various acoustic effects to the thus-generated tone signals. As well known in the art, each performance pattern data comprises a combination of timing data indicative of time points at which various tone-generation related event data, such as tone generating and tone deadening data, are to be processed and event data indicative of content of various events, such as key-on event and key-off events, for generating and deadening a tone. Each tone signal generated by the tone generator/effecter circuit 7 is audibly generated or sounded via a sound system 7A including an amplifier and speaker. The tone generator/effecter circuit 7 and sound system 7A may be constructed in any desired conventionally-known manner. For example, the tone generator/effecter circuit 7 may employ any desired tone synthesis method, such as the FM, PCM, physical model or formant synthesis method. Further, the tone generator/effecter circuit 7 may be implemented by either dedicated hardware or software processing performed by the CPU 1 or a DSP (Digital Signal Processor).

The storage device 8 stores therein not only various data, such as style data to be used for automatic accompaniments, drum kits each predefining a combination of a plurality of drum tone colors and waveform data (not shown) of various tone colors, but also various control programs to be executed by the CPU 1 and the like. In a case where a particular control program is not prestored in the ROM 2, the control program may be prestored in the storage device (e.g., hard disk device) 8, so that, by reading the control program from the storage device 8 into the RAM 3, the CPU 1 is allowed to operate in exactly the same way as in the case where the particular control program is stored in the ROM 2. This arrangement greatly facilitates version upgrade of the control program, addition of a new control program, etc. The storage device 8 may use any of various recording media other than the hard disk (HD), such as a flexible disk (FD), compact disk (CD-ROM or CD-RAM), magneto-optical disk (MO) and digital versatile disk (DVD); alternatively, the storage device 8 may comprise a semiconductor memory, such as a flash memory.

The communication interface (I/F) 9 is an interface for communicating control programs, various data, etc. between the electronic music apparatus of the invention and not-shown external equipment. The communication interface 9 may be a MIDI interface, LAN, Internet, telephone line network or the like. It should be appreciated that the communication interface 9 may be of either or both of wired and wireless types.

In the aforementioned electronic music apparatus of the invention, the performance control unit 4A may be of any other type than the keyboard instrument type, such as a stringed instrument type, wind instrument type or percussion instrument type. Furthermore, needless to say, the electronic music apparatus of the present invention is not limited to the type where the performance control unit 4A, display 6A, tone generator/effect circuit 7, etc. are incorporated together as a unit within the apparatus. For example, the electronic music apparatus of the present invention may be constructed in such a manner that the above-mentioned components are provided separately and interconnected via the communication network 9, such as a MIDI interface, various networks and/or the like.

It should also be appreciated that the electronic music apparatus of the present invention may be any form of apparatus and equipment, such as an automatic performance apparatus, personal computer, portable communication terminal, such as a portable telephone, karaoke apparatus, game apparatus, or the like. In the case where the electronic music apparatus is a portable communication terminal, all of predetermined functions need not be performed by the portable communication terminal alone, in which case a server may have part of the predetermined functions so that the above-described functions can be realized by an entire system comprising the terminal and a server.

The electronic music apparatus of FIG. 1 is constructed in such a manner that, for an automatic accompaniment, particularly of a drum part, it can not only collectively replace a plurality of drum tone colors in response to selection of a drum kit to be allocated to the drum part (drum part channels), but also individually replace any one or more of a plurality of drum tone colors, defined in the drum kit allocated to the drum part, with one or more other drum tone colors (drum components) not only prior to the start of the automatic accompaniment (i.e., during stoppage of reproduction of the style data) but also during the automatic accompaniment (i.e., during reproduction of the style data). Such drum tone color replacement will be detailed later.

Figure 2:
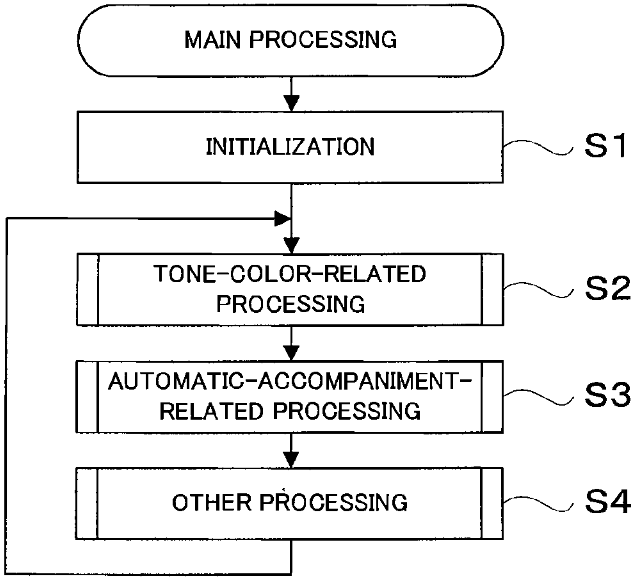
FIG. 2 is a flow chart showing an example operational sequence of main processing performed in the electronic music apparatus of FIG. 1.

FIG. 2 is a flow chart of an example operational sequence of "main processing" executed in the electronic music apparatus of FIG. 1 for performing various tone-reproduction-related control. The main processing is started up in response to powering-on of the electronic music apparatus and then repetitively performed until it is ended in response to powering-off of the electronic music apparatus.

At step S1, predetermined initialization is performed, for example, for clearing various tone-control-related settings (of parameters), allocating predetermined default style data to individual channels, among other things. At next step S2, tone-color-related processing is performed. The tone-color-related processing includes, but not limited to, a process for newly creating waveform data (tone color data) corresponding to various musical instrument tones, such as piano, guitar and drum tone colors, and a process for selecting (or designating) and editing existing tone color data; however, because these processes are known in the art, explanations about the processes are omitted here. At following step S3, automatic-accompaniment-related processing is performed. The automatic-accompaniment-related processing includes, but not limited to, processes for selecting, creating, editing and reproducing (i.e., executing an automatic accompaniment based on) automatic accompaniment style data; in the instant embodiment, one or more other processes can be performed particularly in parallel with the reproducing process. These processes included in the automatic-accompaniment-related processing will be described later with reference to FIGS. 3 to 9. At step S4, other processing than the aforementioned is performed, which includes, but not limited to, a process for making settings for the entire apparatus, and a tone reproduction process (manual performance) based on user's operation on the aforementioned performance control unit 4A.

Figure 3:
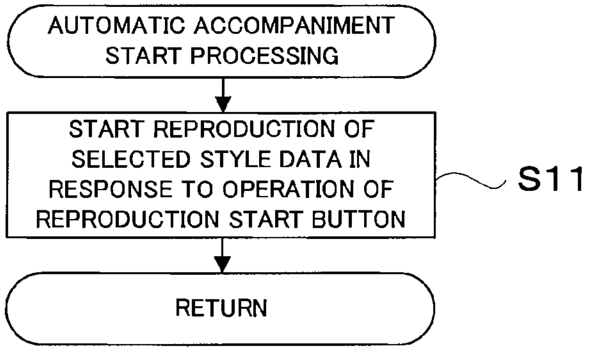
FIG. 3 is a flow chart showing an example operational sequence of automatic accompaniment start processing.

The following describe processes included in the above-mentioned automatic-accompaniment-related processing (step S3 in FIG. 2). First, with reference to FIGS. 3 and 4, a description will be given about automatic accompaniment start and stop processing for starting and stopping an automatic accompaniment performed by reproducing automatic accompaniment style data. FIG. 3 is a flow chart showing an example operational sequence of the "automatic accompaniment start processing", while FIG. 4 is a flow chart showing an example operational sequence of the "automatic accompaniment stop processing".

In the automatic accompaniment start processing shown in FIG. 3, a process is performed at step S11, in response to operation of a not-shown "reproduction start" button, for starting tone reproduction based on style data currently selected. At that time, if any style data is currently selected by the user, tones are reproduced on the basis of the currently-selected style data, while, if no style data is currently selected by the user, tones are reproduced on the basis of predetermined default style data.

Upon start of the reproduction, event data included in the part-by-part performance pattern data are sequentially read out in accordance with a predetermined tempo and supplied to the tone generator/effect circuit 7, so that an automatic accompaniment, comprising a plurality of performance parts including the drum part, is performed by means of timer interrupt processings which is not shown in the drawings. The performance pattern data of each of the performance parts comprises performance pattern data of one or more measures, and such performance pattern data is repetitively reproduced until later-described automatic accompaniment stop processing is executed. Note that the performance pattern data is not limited to the above-mentioned repetitively-reproduced pattern data (main pattern data) and may include intro pattern data, fill-in pattern data, ending pattern data, etc. that are reproduced only once in response to user's instruction via a not-shown switch. In each of the performance parts, tone color designating data, designating tones to be generated, is stored in association with the part, and such tone color designating data is supplied to the tone generator/effecter circuit 7 so that tone signals are generated with desired tone colors on a part-by-part basis. Particularly, for the drum part, data designating any one of a plurality of types of drum kits is prestored as the tone color designating data.

Figure 4:
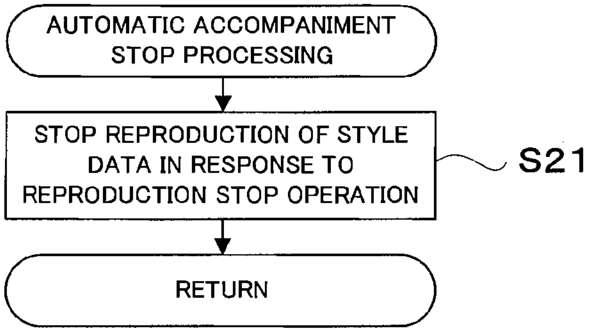
FIG. 4 is a flow chart showing an example operational sequence of automatic accompaniment stop processing.

In the automatic accompaniment stop processing shown in FIG. 4, on the other hand, a process is performed at step S21, in response to operation of a not-shown "reproduction stop" button, for stopping tone reproduction based on style data currently selected. Such automatic accompaniment start processing and automatic accompaniment stop processing, namely the timer interrupt processings, can be performed concurrently or in parallel with one or more other processes included in the automatic-accompaniment-related processing, and thus, even when a drum kit is currently selected or edited, automatic accompaniment tone reproduction can be started any time in response to user's operation of the reproduction start button, and automatic accompaniment tone reproduction can be stopped immediately in response to user's operation of the reproduction stop button.

Figure 5:
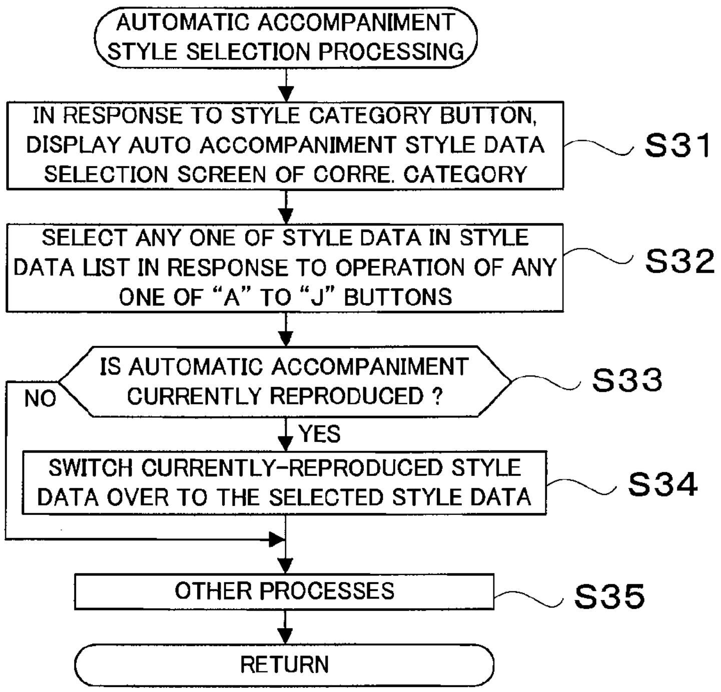
FIG. 5 is a flow chart showing an example operational sequence of automatic accompaniment style selection processing.

Next, with reference to FIG. 5, a description will be given about an "automatic accompaniment style selection processing" for selecting automatic accompaniment style data. FIG. 5 is a flow chart showing an example operational sequence of the "automatic accompaniment style selection processing". At step S31, a process is performed, in response to operation of a style category button, for displaying, on the display 6A, an "automatic accompaniment style data selection screen" that presents a style data list of a category corresponding to the operated style category button.

Figure 10:
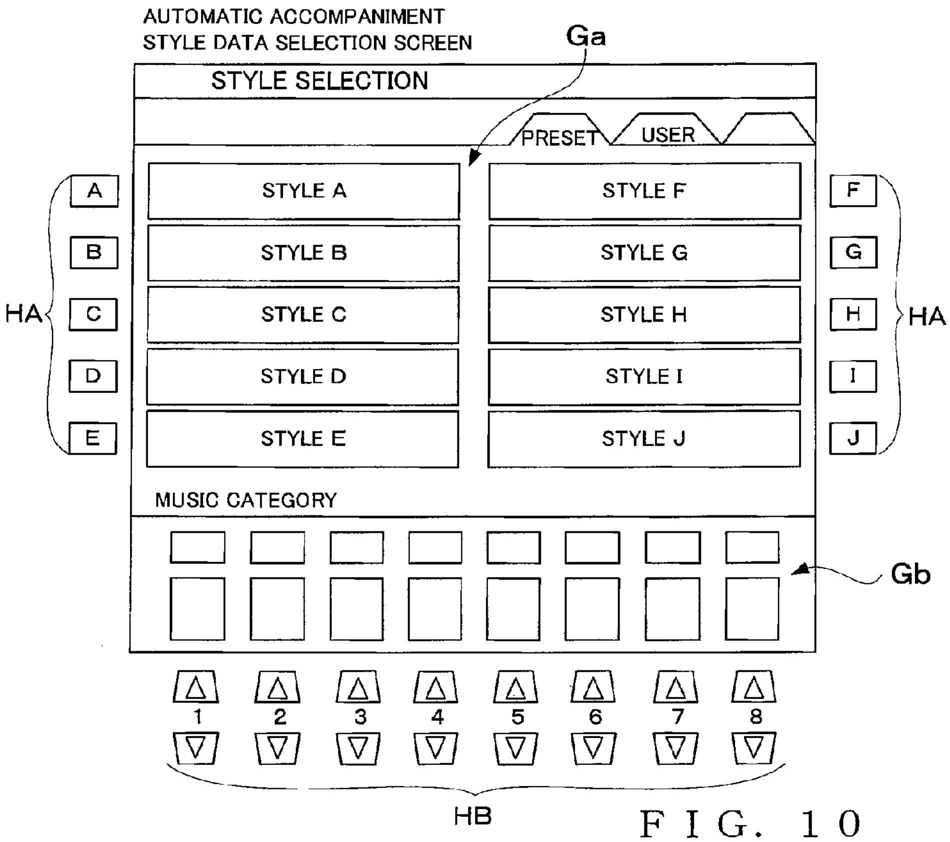
FIG. 10 is a conceptual diagram showing an example of an automatic accompaniment style data selection screen displayed on a display of the electronic music apparatus.

The following describe the above-mentioned "automatic accompaniment style data selection screen", with reference to FIG. 10. FIG. 10 is a conceptual diagram showing an example of the "automatic accompaniment style data selection screen" that is displayed on the display 6A in response to user's operation of any one of a plurality of style category buttons (not shown) provided in corresponding relation to selectable music categories, such as rock music and pop music.

The "automatic accompaniment style data selection screen" shown in FIG. 10 is a screen that presents, for a selected music category, candidate style data that can be selectively used for automatic accompaniments and that allows the user to select (designate) desired style data to be used for an automatic accompaniment. Namely, a style data list, listing one or more candidate style data usable for automatic accompaniments, is displayed in an icon form at screen positions (display area Ga) corresponding to the general-purpose buttons HA (i.e., "A" to "J" buttons HA) provided along opposite sides of the display 6A, and, by operation of any one of the "A" to "J" general-purpose buttons HA, the user can select (designate) any one of the style data (Style A to Style J). For example, assuming that Style A is of a "rock" music category, once the user operates the "A" button HA, Style A, corresponding to a hard rock style, classic eight beat style or the like, will be selected.

Predetermined function icons may be displayed at screen positions (display area Gb) corresponding to general-purpose upward/downward switches HB, operable by the user to perform upward/downward shift operation on a displayed screen and provided immediately above and below Nos. "1" to "8" located in a lower section of the display 6A, so that, in response to user's operation of any one of the "1" to "8" general-purpose switches HB, a predetermined function corresponding to the function icon of the operated general-purpose switch HB is performed.

Referring back to the flow chart of FIG. 5 for realizing various processes responsive to various operation on the "automatic accompaniment style data selection screen", at step S32, any one of the style data in the style data list is selected (designated) in response to user's operation of any one of the "A" to "J" buttons HA. At next step S33, a determination is made as to whether or not any automatic accompaniment is currently being reproduced. If no automatic accompaniment is currently being reproduced as determined at step S33 (NO determination at step S33), control jumps to step S35, where, in this case, style data is selected in preparation for the start of subsequence reproduction of an automatic accompaniment. If, on the other hand, any automatic accompaniment is currently being reproduced (YES determination at step S33), the style data currently being reproduced is switched over to the selected style data, at step S34. In this case, the currently reproduced automatic accompaniment need not necessarily be switched over to the selected style data in immediate response to the style data selection; alternatively, the currently reproduced automatic accompaniment may be switched over to the selected style data at any desired time point after the style data selection, e.g. at a bar line immediately following a measure currently being reproduced on the basis of performance pattern data of the drum part. At step S35, other processes are performed, which include, but not limited to, a process for performing predetermined functions corresponding to the function icons displayed in association with the "1" to "8" switches HB; however, such other processes will not be described here because they are not pertinent to the present invention.

Figure 6:
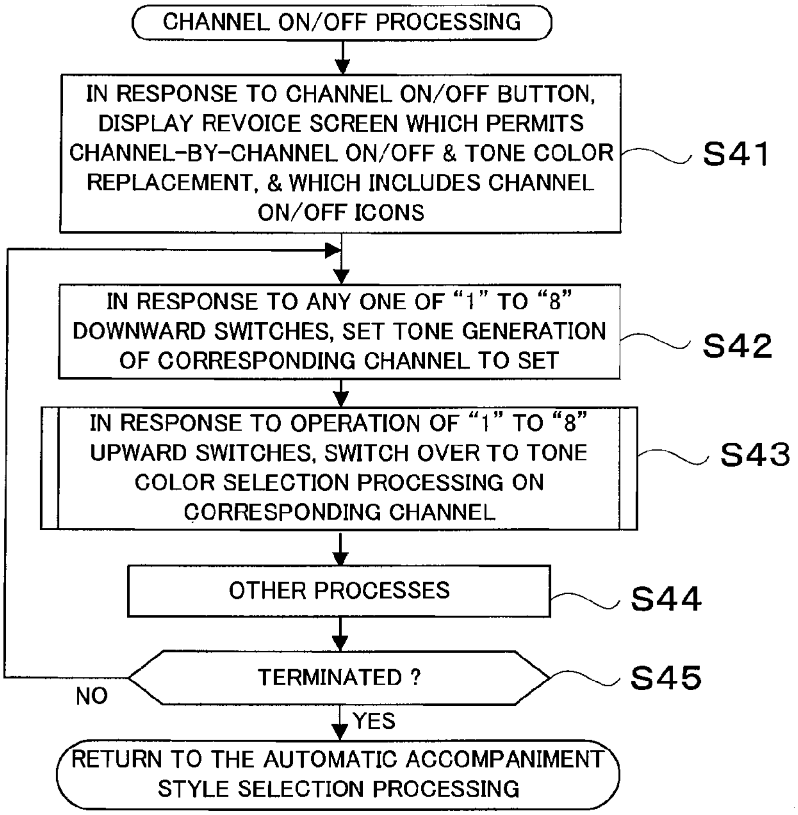
FIG. 6 is a flow chart showing an example operational sequence of channel ON/OFF processing.

With reference to FIG. 6, the following describe "channel ON/OFF processing" for performing predetermined functions, such as a revoice (i.e., tone color replacement) function, on a per-channel (i.e., on a per-part) basis. FIG. 6 is a flow chart showing an example operational sequence of the channel ON/OFF processing, which is executable irrespective of whether or not any style data is currently being reproduced. A revoice screen that indicates channel ON/OFF function icons for realizing the predetermined functions, such as channel-by-channel (i.e., part-by-part) tone generation ON/OFF setting and tone color replacement functions irrespective of whether or not an automatic accompaniment is currently being performed is displayed, at step S41, on the automatic accompaniment style data selection screen in response to a not-shown channel ON/OFF button being operated while the automatic accompaniment style data selection screen of FIG. 10 is displayed. The term "revoice screen" is used herein to distinguish from the automatic accompaniment style data selection screen of FIG. 10.

Figure 11:
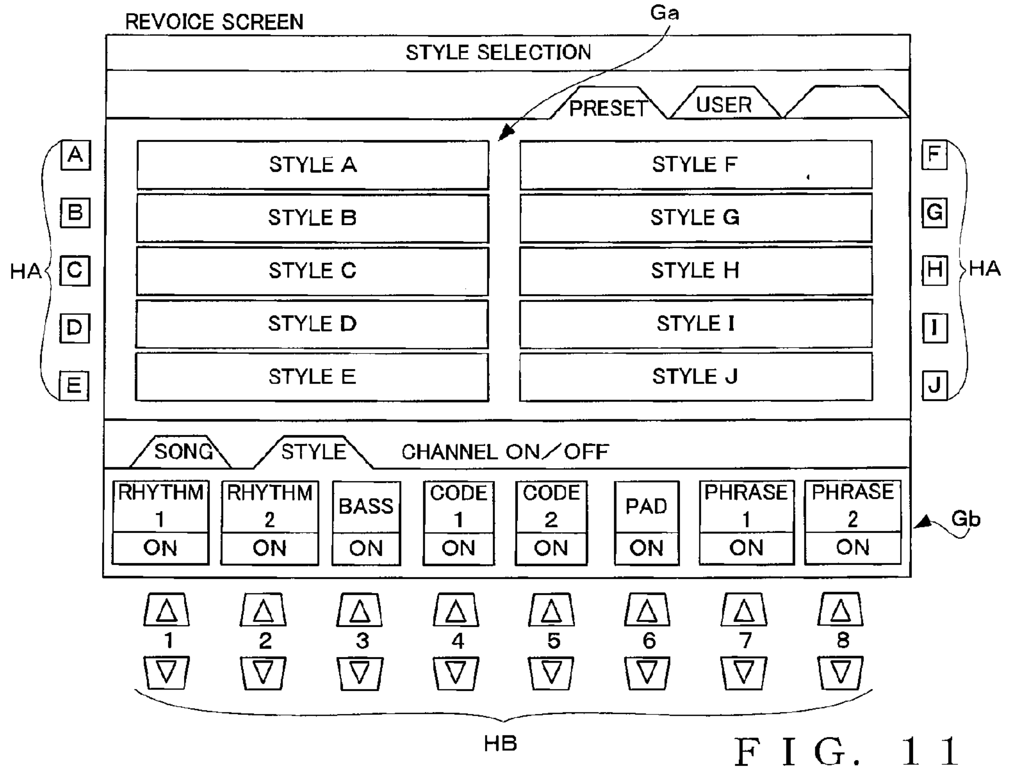
FIG. 11 is a conceptual diagram showing an example of a revoice screen.

The following describe the revoice screen with reference to FIG. 11. FIG. 11 is a conceptual diagram showing an example of the revoice screen. As seen from the figure, the revoice screen is different from the automatic accompaniment style data selection screen of FIG. 10 only in displayed content of the display area Gb, and thus, features pertaining only to the display area Gb of the revoice screen will be described below.

The channel ON/OFF function icons displayed, in the display area Gb of the revoice screen shown in FIG. 11, in association with the "1" to "8" switches HB indicate that tone generation ON/OFF setting and revoice (tone color replacement) functions are assigned to the individual switches HB for the individual channels (corresponding to the performance parts), such as "rhythm 1" and "rhythm 2". In the illustrated example of FIG. 11, revoice functions of the individual channels (first to eighth channels), i.e. rhythm accompaniment 1, rhythm accompaniment 2, bass accompaniment, chord accompaniment 1, chord accompaniment 2, pad accompaniment, phrase accompaniment 1 and phrase accompaniment 2 are assigned to the upward switches HB provided immediately above Nos. "1" to "8" (i.e., "1" to "8" upward switches HB), while tone generation ON/OFF setting functions of the individual channels are assigned to the downward switches HB of Nos. "1" to "8" (i.e., "1" to "8" downward switches HB). Once any one of the "1" to "8" upward switches HB is operated by the user, the revoice screen switches over to a "tone color selection screen" of FIG. 12 which presents candidate tone colors capable of being used as replacing tone colors of the channel associated with the operated switch HB and which thereby allows the user to select any one of the candidate tone colors as a replacing tone color. Note that no channel ON/OFF function icon may be displayed for any of the switches HB; in this case, the channel corresponding to such a switch HB, for which no channel ON/OFF function icon is displayed, is an empty channel.

Figure 7:
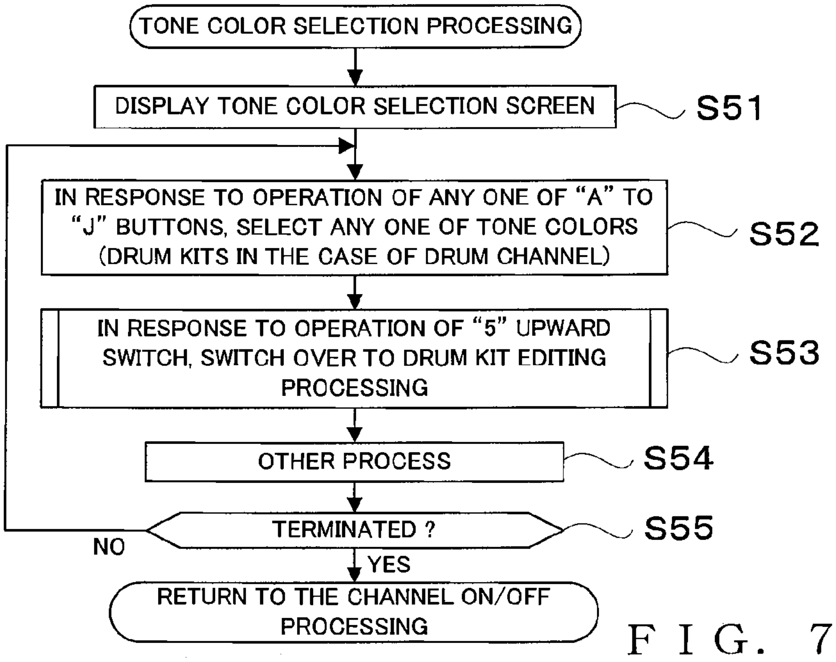
FIG. 7 is a flow chart showing an example operational sequence of tone color selection processing.

Referring to the flow chart of FIG. 6 for realizing various processes responsive to operation on the aforementioned revoice screen, a process is performed at step S42, in response to operation of any one of the "1" to "8" downward switches HB, for setting tone generation of the corresponding channel to an ON or OFF state. At step S43, in response to operation of any one of the "1" to "8" upward switches HB, the screen is switched over to the "tone color selection screen" of FIG. 12, but also tone color selection processing of FIG. 7 is performed to allow the user to select a desired tone color for the corresponding channel. At following step S44, other processes than the tone color selection processing, such as selection of style data responsive to operation of any one the "A" to "F" buttons HA, are performed. At next step S45, a determination is made as to whether or not a not-shown Exit button has been operated to terminate the channel ON-OFF processing, i.e. whether the channel ON-OFF processing has been terminated in response to operation of the Exit button. If the Exit button has not been operated to terminate the channel ON-OFF processing (NO determination at step S45), control reverts to step S42 so that the processes at and after steps S42 and S45 are repeated. If, on the other hand, the Exit button has been operated to terminate the channel ON-OFF processing (YES determination at step S45), then the current channel ON/OFF states are settled, and the channel ON-OFF processing is terminated. Upon termination of the channel ON-OFF processing, control returns to the automatic accompaniment style selection processing of FIG. 5, and the screen display is switched over to the automatic accompaniment style data selection screen of FIG. 10.

With reference to FIG. 7, the following describe the above-mentioned tone color selection processing (step S43 in FIG. 6) which allows the user to select a desired tone color for the selected channel. FIG. 7 is a flow chart showing an example operational sequence of the tone color selection processing, which is also executable irrespective of whether or not any style data is currently being reproduced. At step S51, a tone color selection screen is displayed on the display 6A.

Figure 12:
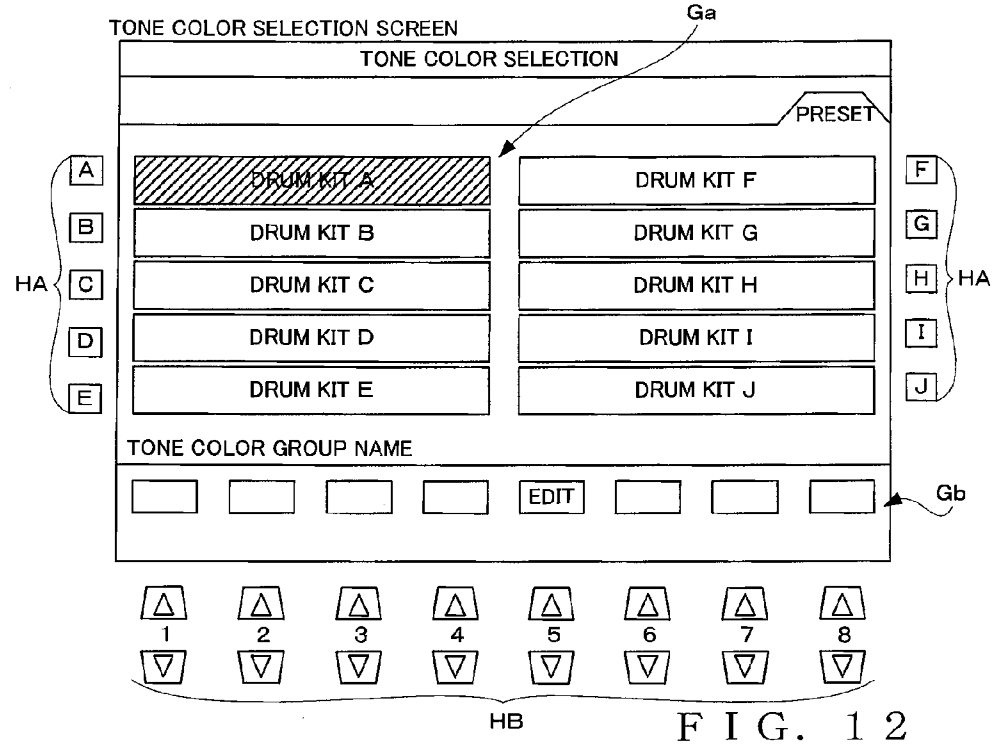
FIG. 12 is a conceptual diagram showing an example of a tone color selection screen displayed on the display of the electronic music apparatus.

The tone color selection screen will be described with reference to FIG. 12. FIG. 12 is a conceptual diagram showing an example of the tone color selection screen that is displayed in response to user's operation of the "1" upward switch HB on the revoice screen shown in FIG. 11.

The tone color selection screen of FIG. 12 is a screen that presents, for a selected tone color group, candidate drum kits (tone colors) allocatable to the "rhythm 1" channel (i.e., rhythm part) so that the user can select (designate), from among the candidate drum kits, a drum kit to be allocated to the "rhythm 1" channel. Namely, a drum kit list, listing one or more allocatable candidate drum kits, is displayed in an icon form at screen positions (display area Ga) corresponding to the "A" to "J" general-purpose buttons HA provided on the opposite sides of the display 6A, so that any one of drum kit A to drum kit J in the drum kit list can be selected (designated) as a drum kit to be allocated to "rhythm 1". If the "A" button HA is operated, "drum kit A" (e.g., acoustic kit, rock kit, blues kit, or the like) is selected in the illustrated example of FIG. 12.

Further, as set forth above, the instant embodiment is constructed in such a manner that, even during an automatic accompaniment, it can not only collectively replace a plurality of drum tone colors in response to a change of drum kit allocation through operation of any one of the above-mentioned "A" to "J" buttons but also replace any one or more of a plurality of drum tone colors, defined in an allocated drum kit, with one or more other drum tone colors. More specifically, a drum kit editing function is assigned in advance to the "5" upward switch HB so that a corresponding "editing icon" is displayed at the corresponding position on the tone color selection screen of FIG. 12, and the screen is switched over to a "drum kit editing screen" of FIG. 13 in response to operation of the "5" upward switch HB so that one or more drum tone colors can be individually replaced with one or more other drum tone colors. Details of such drum tone color replacement will be described later.

Referring back to the flow chart of FIG. 7 for realizing various processes responsive to operation on the above-mentioned tone color section screen, any one of tone colors (any one of drum kits in the case of the rhythm part) is selected at step S52 in response to operation of any one of the "A" to "J" buttons. For the rhythm part, when any (at least one) of a plurality of drum tone colors defined in a currently-allocated drum kit is to be replaced, it is not necessarily necessary to operate any one of the "A" to "J" buttons; namely, any one of the "A" to "J" buttons has to be operated only when it is desired to replace a drum kit itself, i.e. when it is desired to collectively replace a plurality of drum tone colors defined in the drum kit. At step S53, not only the screen display is switched over the drum kit editing screen of FIG. 13, but also drum kit editing processing for allowing the user to select a drum tone color to be replaced (as will be described later in relation to FIG. 13) is performed, in response to operation of the upward switch of No. "5". However, it should be appreciated that, when any of tone colors other than drum kit tone colors are to be replaced, a process corresponding to each tone color selected through operation of any one of the "A" to "J" buttons HA is performed without the drum kit editing processing being performed and without the screen display being switched over to the drum kit editing screen. At step S54 are performed other processes, such as a process responsive to operation of another upward or downward switch HB than the "5" upward switch HB.

At next step S55, a determination is made as to whether not-shown Exit button has been operated to terminate the tone color selection processing, i.e. whether the tone color selection processing has been terminated in response to operation of the Exit button. If the Exit button has not been operated to terminate the tone color selection processing (NO determination at step S55), control reverts to step S52 so that the processes at steps S52 and S55 are repeated. If, on the other hand, the Exit button has been operated to terminate the tone color selection processing (YES determination at step S55), the current tone color selection states are settled, and the tone color selection processing is terminated. Upon termination of the tone color selection processing, control returns to the channel ON/OFF processing of FIG. 6, and the screen display is switched over to the revoice screen of FIG. 11.

Figure 8:
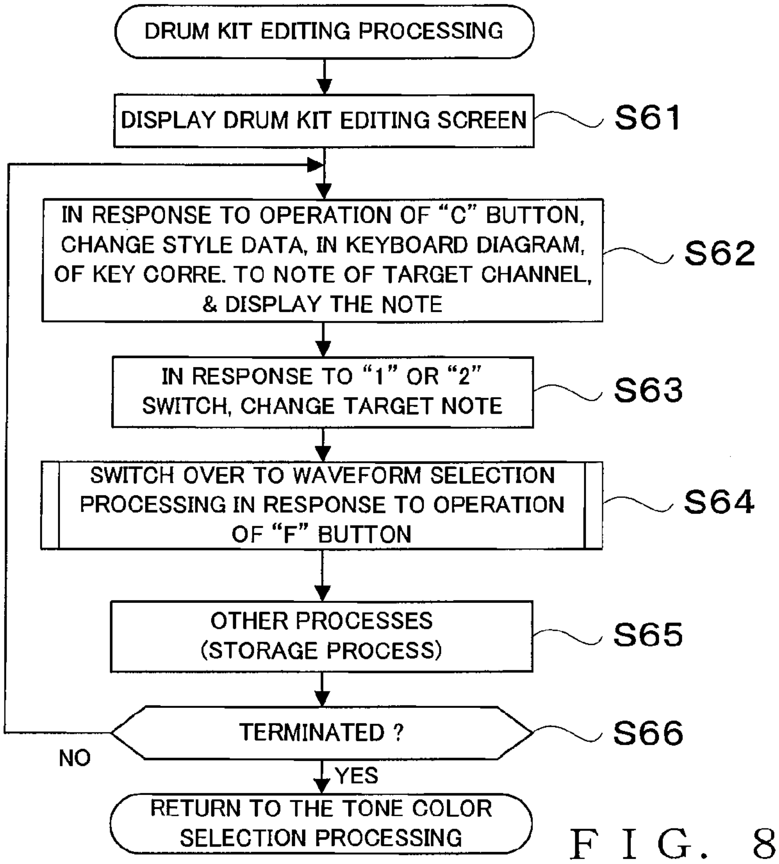
FIG. 8 is a flow chart showing an example operational sequence of drum kit editing processing.

The following describe the drum kit editing processing for replacing any of a plurality of drum tone colors defined in the selected drum kit, with reference to FIG. 8. FIG. 8 is a flow chart showing an example operational sequence of the drum kit editing processing, which is also executable irrespective of whether or not any style data is being currently reproduced. At step S61, the drum kit editing screen is displayed on the display 6A.

Figure 13:
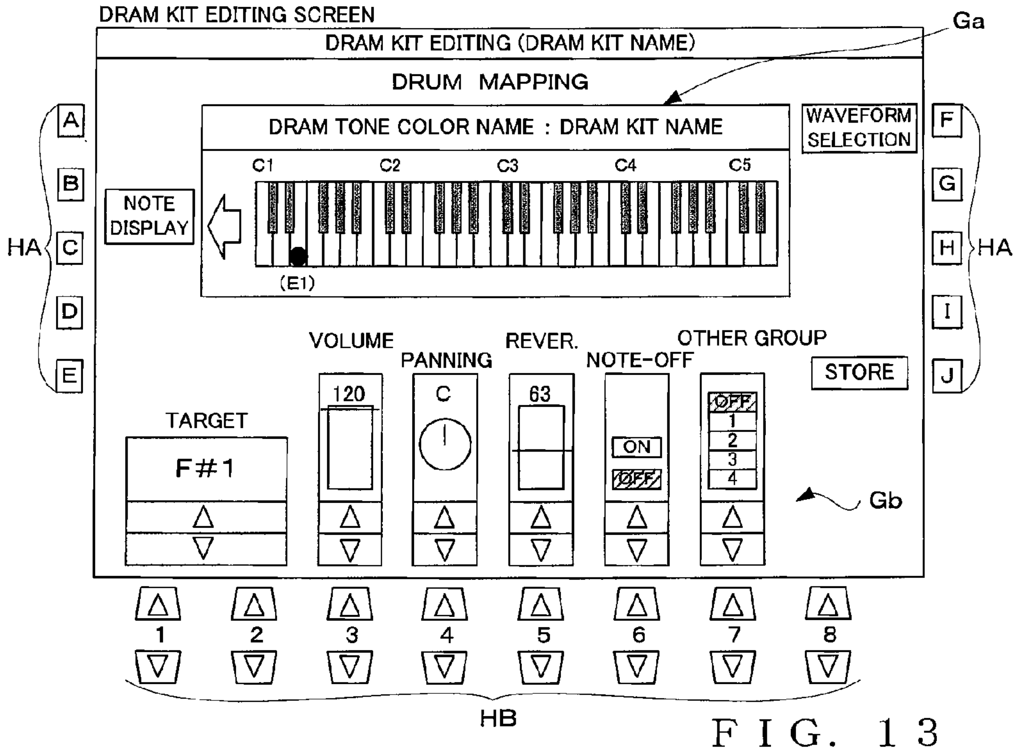
FIG. 13 is a conceptual diagram showing an example of a drum kit editing screen displayed on the display of the electronic music apparatus.

The following describe the above-mentioned drum kit editing screen, with reference to FIG. 13. FIG. 13 is a conceptual diagram showing an example of the drum kit editing screen. As known in the art, each drum kit includes waveform data of a plurality of drum tone colors. The waveform data of the drum tone colors are allocated to different tone pitches, namely different notes or keys on a keyboard. Thus, as shown in FIG. 13, the name of the waveform data of a drum tone color (i.e., drum tone color name) currently allocated to a designated note ("F#1" in the illustrated example) is displayed in the display area Ga together with the drum kit name. Note that a keyboard diagram appeared in the display area Ga in FIG. 13 is an optional display and such a keyboard diagram can be omitted accordingly. First, the description will be made assuming such a keyboard diagram is omitted. When the drum tone color (waveform data) currently allocated to the note "F#1" is to be replaced with another drum tone color (waveform), the "F" button HA to which a "waveform selection" function (waveform selection icon) is assigned is operated. In response to operation of the "F" button HA, the screen display is switched over to a "waveform selection screen" of FIG. 14 which presents candidate drum tone colors capable of replacing the drum tone color currently allocated to the tone color "F#1", so that the user is allowed to select, from among the presented drum tone colors, a drum tone color that should replace the drum tone color currently allocated to the tone color "F#1", as will be described in detail later.

In the instant embodiment, each drum tone color for which the waveform data is to be replaced (i.e., which is to be made a target of waveform data replacement) is designated by user's operating the "1" or "2" upward or downward switch HB. For example, when a drum tone color other than the drum tone color corresponding to the currently-displayed note "F#1" is to be replaced (i.e., to be made a target drum tone color), the user only has to operate the "1" or "2" upward or downward switch HB to re-select a note which should replace the currently-displayed note "F#1". However, some user may not able to be clearly identify relationship between a particular drum tone color and a note. For example, when the user desires to replace a particular one of a plurality of drum tone colors, included in performance tones of a drum part generated in accordance with performance pattern data, with another drum tone color while listening to the drum-part performance tones, the user cannot identify a note to which the particular drum tone color (e.g., bass drum) is currently allocated, by only actually listening to the drum performance that is being executed in an automatic accompaniment. Thus, it has been conventional for such a user to employ an approach of sequentially changing the note to various other notes and viewing names of drum tone color waveform data (drum tone color names) sequentially displayed on the screen in response to the changing notes. Although such an approach allows the user to arrive at the bass drum sooner or later, it would take a lot of time and labor and hence become cumbersome.

In order to avoid the above-mentioned inconvenience, the instant embodiment of the electronic music apparatus is constructed in such a manner that a note to which each drum tone color to be sounded is allocated is displayed, in response to user's operation of the "C" button HA having a "note display" function (note display icon) allocated thereto, in the keyboard diagram, as shown in the display area Ga in FIG. 13, in accordance with tone generation of an automatic accompaniment. In a case where the bass drum is allocated to a note "E1", for example, a display style of the keyboard is changed to indicate a position, in the keyboard diagram, of the note "E1" in response to a tone of the bass drum being generated in an automatic accompaniment, but also the note "E1" is displayed in a combination of a letter "E" and number ("1") in association with a key in the keyboard diagram to which the note "E1" is currently assigned; although the key at the "E1" position is indicated by a black circle in the illustrated example, it may be indicated using another display style, e.g. by a black circle with a part inverted to white, or by a changed color. Such a note display in the keyboard diagram is updated each time a drum tone color is performed in accordance with a progression of the automatic accompaniment. Thus, by reading the note (e.g., E1) displayed in the keyboard diagram upon sounding of the bass drum, which is a particular tone color the user, listening to the automatic accompaniment, desires to replace with another drum tone color, the user can promptly identify as "E1" the note (replacement target note) to which the bass drum is currently allocated. Then, if the user desires to replace the bass drum with another drum tone color, the user can designate "E1" as the replacement target note, by operating the "1" or "2" upward or downward switch HB. Note that, in a case where another drum tone is being generated concurrently with the bass drum in an automatic accompaniment, a plurality of notes are displayed concurrently in the keyboard diagram. In this case, the user can arrive sooner or later at a particular note to which the bass drum is currently allocated, by reading the plurality of notes displayed in the keyboard diagram and operating the "1" or "2" upward or downward switch HB to thereby sequentially re-select the target note only from between the displayed notes. Thus, although user operation required in this case is more complicated and cumbersome than in the case where the bass drum is being sounded alone, the instant embodiment advantageously allows the user to relatively easily identify the note to which the bass drum is currently allocated. Note that the above-mentioned note display may be realized in any other desired manner, without using keyboard diagram, as long as the note display allows the user to visually identify which one of a plurality of drum tone colors of a drum kit each currently-reproduced drum tone color corresponds to.

Note that, when settings of various automatic-accompaniment-related parameters, such as a volume, panning and reverberation, are to be changed without a drum tone color being replaced, it is only necessary to operate the "3", "4" and "5" switches HB. For that purpose, function icons corresponding to various functions are displayed in the display area Gb in association with the switches HB. Parameter settings etc. are also displayed by these function icons.

Referring back to the flow chart of FIG. 8 realizing various processes responsive to user's operation on the drum kit editing screen, not only the display style of a key, in the keyboard diagram, corresponding to a note of a to-be-edited channel (target channel) in currently-reproduced style data is changed but also the note is displayed at step S62 in response to operation of the "C" button HA having the note display function allocated thereto. Note that, when no style data is currently being reproduced, the above-mentioned process need not be performed. At next step S63, not only a replacement target note display, made in a left lower portion of the drum kit processing screen, is changed in response to operation of the "1" or "2" switch HB, but also the changed note (i.e., note displayed after the display change) is determined as a replacement target note. Namely, hardware and software for performing the process of step S63 together constitute a first selection section that allows the user to select a replacement target drum tone color, i.e. a drum tone color to be replaced with another drum tone color. At following step S64, in response to operation of the "F" button HA, not only the screen display is switched over to the "waveform selection screen" of FIG. 14, but also waveform selection processing (FIG. 9) for selecting waveform data of the drum tone color that should replace the waveform data of the replacement target drum tone color is performed. Then, at step S65 are performed other processes, such as a parameter setting change process responsive to operation of the "3" to "7" switches HB, and storage/allocation process responsive to operation of the "J" button HA. In the storage/allocation process, as will be later detailed with reference to FIG. 16, drum kits each having one or more drum tone colors replaced (i.e., drum kits having been subjected to drum tone color replacement, or post-replacement drum kits) are stored separately from drum kits not yet subjected to drum tone color replacement (or pre-replacement drum kits), and the performance pattern data (drum part) of the style data and the post-replacement drum kits are associated with each other in such a manner that the stored post-replacement drum kits will be referred to subsequently.

At next step S66, a determination is made as to whether or not the not-shown Exit button has been operated to terminate the drum kit editing processing, i.e. whether the drum lit editing processing has been terminated in response to operation of the Exit button. If the Exit button has not been operated to terminate the drum kit editing processing (NO determination at step S66), control reverts to step S62 so that the processes at steps S62 to S66 are repeated. If, on the other hand, the Exit button has been operated to terminate the drum kit editing processing (YES determination at step S66), the current drum kit editing state is settled, and the drum kit editing processing is terminated. Upon termination of the drum kit editing processing, control returns to the tone color selection processing of FIG. 7, and the screen display is switched over to the tone color selection screen of FIG. 12.

Figure 9:
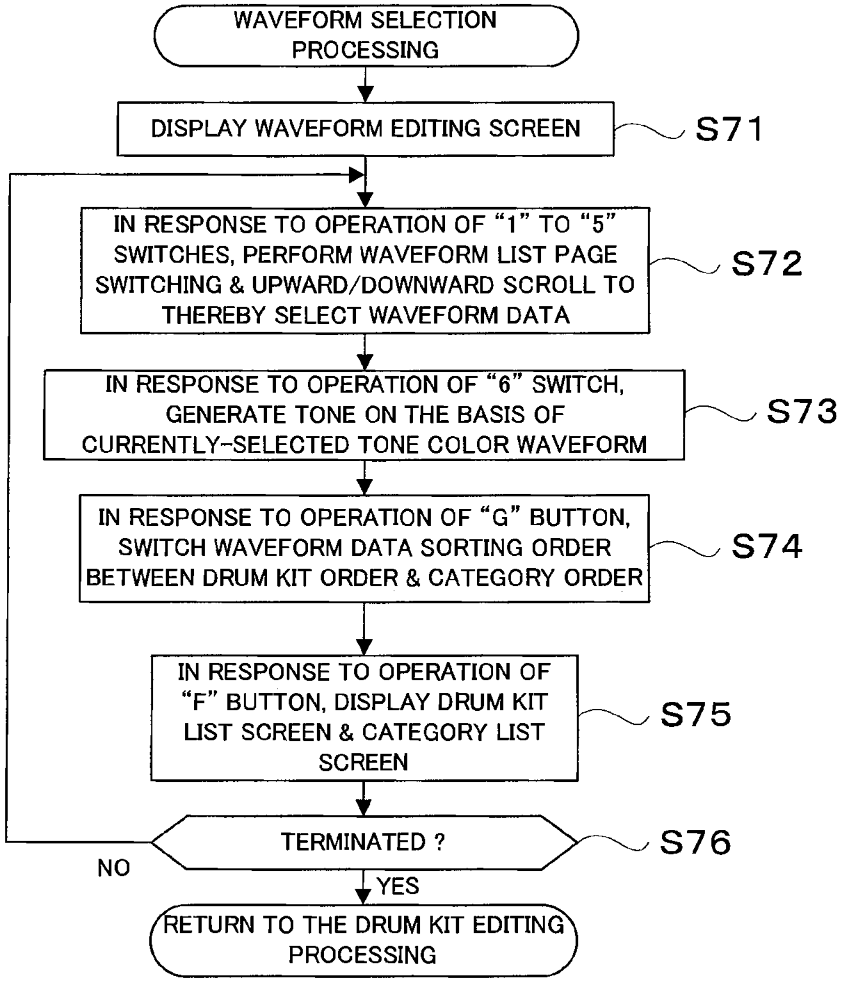
FIG. 9 is a flow chart showing an example operational sequence of waveform selection processing.

The following describe the waveform selection processing (step S64 in FIG. 8) with reference to FIG. 9. FIG. 9 is a flow chart showing an example operational sequence of the waveform selection processing. At step S71, the waveform selection screen is displayed on the display 6A.

Figure 14:
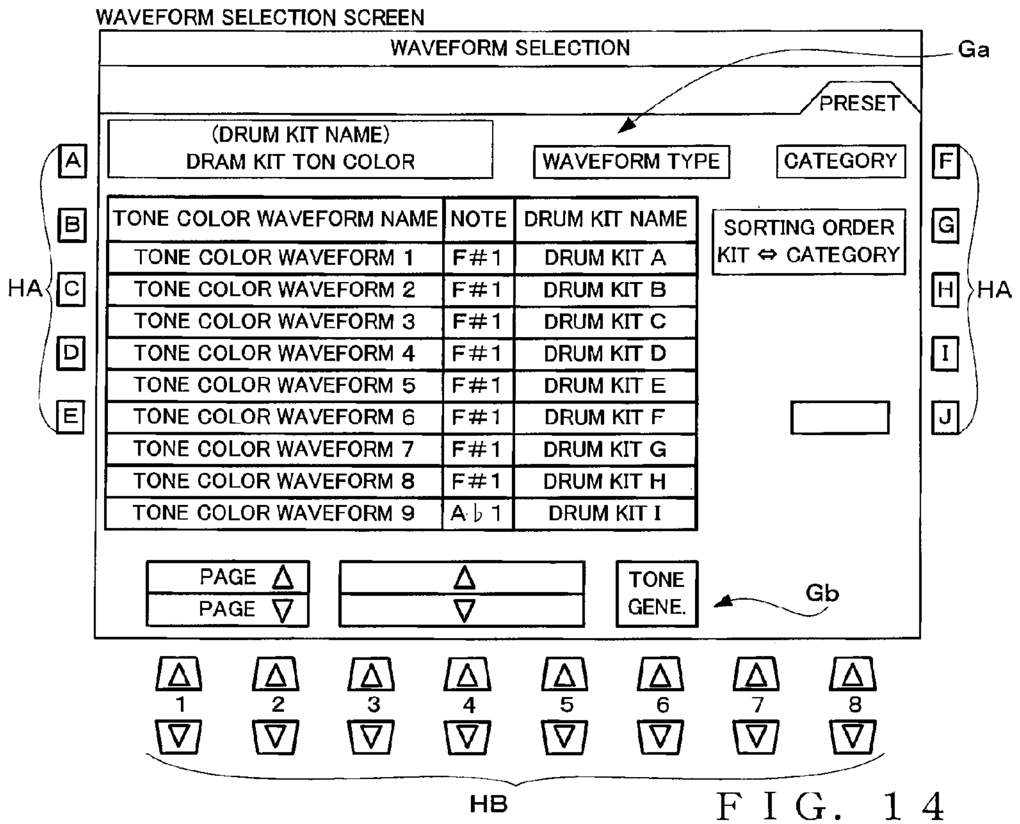
FIG. 14 is a conceptual diagram showing an example of a waveform selection screen displayed on the display of the electronic music apparatus.

FIG. 14 is a conceptual diagram showing an example of the waveform selection screen. On the waveform selection screen, as shown in FIG. 14, waveform data of selectable drum tone colors (i.e., candidate drum tone colors) capable of replacing designated drum tone colors are displayed in the display area Ga as a waveform list that presents tone color waveform (data) names, allocated notes of the tone color waveform data, names of drum kits corresponding to the tone color waveform data, etc. Also, function icons are displayed in the display area Ga in association with various functions in such a manner that the display of the waveform list can be changed on a page-by-page basis in response to operation of any of the "1" and "2" upward and downward switches HB and that the waveform data of a desired drum tone color can be selected from the waveform list by upward or downward scroll in response to operation of any one of the "3", "4" and "5" upward and downward switches HB. Further, another function icon (tone generation icon) is displayed in the display area Ga in such a manner that only the waveform data of a drum tone color selected through operation of any of the "6" upward and downward switches HB can be sounded independently. Furthermore, the user can confirm, by operating any of the "6" upward and downward switches HB, whether the selected drum tone color waveform data is one desired by the user.

In the illustrated example of FIG. 14, the "G" button HA is assigned a function (sorting order icon) for changing displayed order, in a waveform list, of waveform data in "category order" or "drum kit order" (i.e., order of note names to which the waveform data are allocated in a drum kit). Namely, through user's operation of the "G" button HA, it is possible to change the waveform data sorting into the "category order" or "drum kit order". Thus, when the user desires to select waveform data on the basis of the categories of drum tone colors, the user can cause a waveform list of waveform data, sorted in the category order, to be displayed on the screen, while, when the user desires to select waveform data on the basis of his or her memory of, for example, "a certain drum tone color included in a particular drum kit", the user can cause a waveform list of waveform data, sorted in the drum kit order, to be displayed on the screen. In this way, the user can advantageously select desired waveform data with an increased efficiency.

Figure 15:
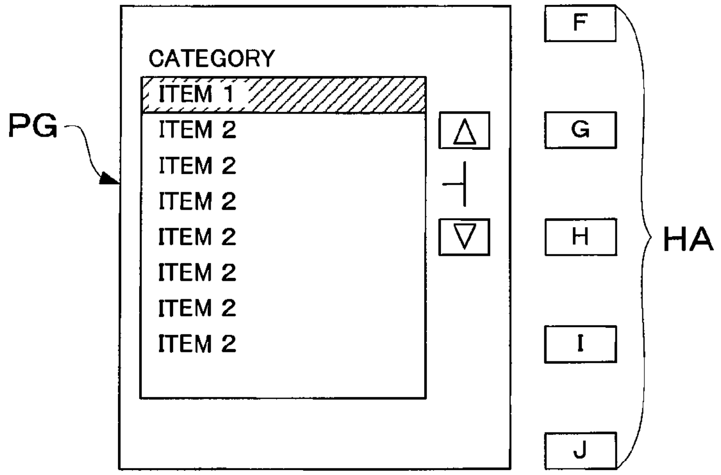
FIG. 15 is a conceptual diagram showing an example of a category list screen displayed on the display of the electronic music apparatus.

In the case where the above-mentioned category order is selected, the "F" button HA is assigned a function (category icon) for displaying a category list screen for making selection as to of which category waveform data are to be displayed in a waveform list. FIG. 15 shows an example of the category list screen PG displayed on the display screen in response to user's operation of the "F" button HA. The category list screen PG is displayed in a pop-up window over the waveform selection screen, and a list of category names ("ITEM 1", . . . in the figure) is displayed on the category list screen PG. Further, function icons of upward and downward buttons are displayed to the right of the list of category names in association with the buttons HA, so that any one of the categories in the list can be selected in response to operation of the "G" or "H" button HA. Once any one of the categories is selected, the category list screen PG is deleted, upon which one or more waveform data are displayed in the waveform list of the "waveform selection screen". Thus, the user can readily arrive at a desired category by merely operating the "F" button HA having the "category" function assigned thereto.

In the case where the "drum kit order" is selected, on the other hand, the "F" button HA is assigned a function of displaying a drum kit list screen (not shown) for selecting of which drum kits waveform data are to be displayed in a waveform list. Namely, in this case, a drum kit list screen, constructed similarly to the category list screen PG and listing drum kit names, is displayed in a pop-up window on the screen in response to user's operation of the "F" button HA, so that the user can readily arrive at a desired drum kit. Note that, in this case, it is desirable to change the name of the function icon, displayed in association with the "F" button HA, from "category" to "drum kit" in that such a name change will prevent the user from misunderstanding the content of the pop-up-displayed list.

Referring back to the flow chart of FIG. 9 for realizing various processes responsive to operation on the aforementioned waveform selection screen, waveform data is selected, at step S72, in accordance with waveform list page switching and upward/downward scroll responsive to operation of the "1" to "5" switches HB. Here, if a desired drum tone color waveform has been selected by the user operating any one of the "3", "4" and "5" upward and downward switches HB on the waveform selection screen, a replacement target (or to-be-replaced) drum tone color included in the drum kit in question (i.e., drum tone color associated with a replacement target note already determined on the drum kit editing screen of FIG. 13) is temporarily replaced with the waveform data of the selected drum tone color. Such temporary replacement is performed as storage updating of a later-described edit buffer EB. Note, however, that only the temporary replacement is effected here, and the replacement is not established or settled yet at this stage and thus is not reflected in an automatic accompaniment. Hardware and software for performing the processes of steps S71 and 72 together constitute a second selection section that displays a list of selectable drum tone color waveforms and allows the user to select a desired drum tone color waveform from the list. At step S73, a tone is generated on the basis of the currently-selected drum tone color waveform data (i.e., drum tone color waveform having temporarily replaced the previous one) in response to user's operation of the "6" switch HB. Thus, the user can auditorily check content of the selected drum tone color waveform. Note that tone generation of the drum tone color waveform having temporarily replaced the previous one is effected separately from the currently-executed automatic accompaniment. Hardware and software for performing the process of step S73 together constitute a tone generation instruction section that causes a tone corresponding to the selected drum tone color waveform to be generated for a checking purpose. At next step S74, the waveform data sorting order is switched as appropriate between the drum kit order and the category order in response to user's operation of the "G" button HA.

At next step S75, the drum kit list screen or the category list screen is displayed in a pop-up window (see FIG. 15) in response to operation of the "F" button HA, so that the user selects any one of items (drum kits or categories) on the displayed list screen by operating a predetermined control. In response to the user's selection of the one item, not only the drum kit list screen or the category list screen is deleted, but also one or more waveform data, classified into the selected drum kit or category, are displayed in the waveform list of the waveform selection screen.

At next step S76, a determination is made as to whether or not the not-shown Exit button has been operated to terminate the waveform selection processing, i.e. whether the waveform selection processing has been terminated in response to operation of the Exit button. If the Exit button has not been operated to terminate the waveform selection processing (NO determination at step S76), control reverts to step S72 so that the processes at steps S72 to S76 are repeated. By such repetition of the processes at steps S72 to S76, the user can repetitively change the temporary replacement of a desired drum tone color with another drum tone color (waveform data). If, on the other hand, the Exit button has been operated to terminate the waveform selection processing (YES determination at step S76), the current selected state of the waveform data is settled, and the waveform selection processing is terminated. Upon termination of the waveform selection processing, control returns to the drum kit selection processing of FIG. 8, and the screen display is switched over to the drum kit selection screen of FIG. 13.

Figure 16:
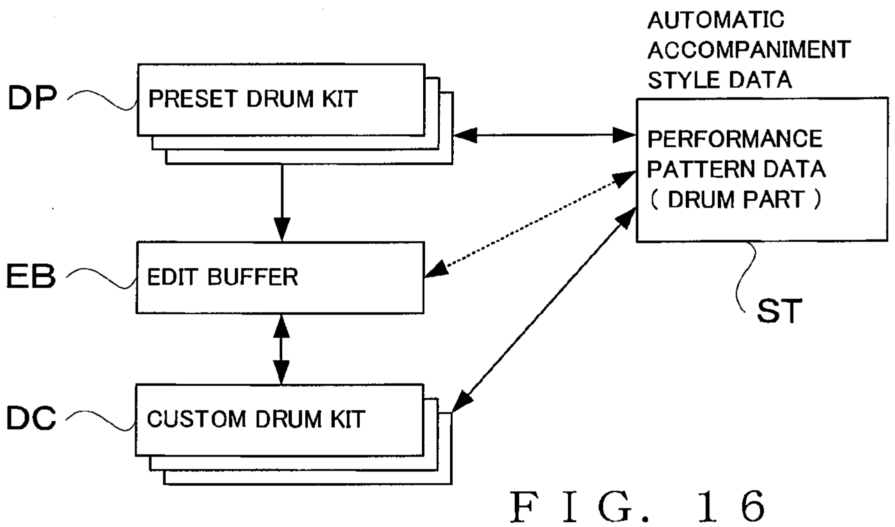
FIG. 16 is a conceptual diagram explanatory of association between drum kits and performance pattern data.

Once the "J" button HA, in association with which a "store" function icon is displaced on the drum kit editing screen, is operated after the screen display is switched from the waveform selection screen of FIG. 14 over to the drum kit selection screen of FIG. 13 in response to operation of the not-shown Exit button (storage process at step S65 of FIG. 8), a drum kit having one or more desired drum tone colors replaced with one or more other drum tone colors (such a drum key will hereinafter be referred to as "custom drum kit") is stored (i.e., stored with another name, or written over the previous or original drum kit). Further, at that time, the custom drum kit is associated with the performance pattern data of the drum part defined in the automatic accompaniment style data. Thus, the style data are changed so that the drum kit, having one or more desired drum tone colors replaced with one or more other drum tone colors, will be referred to subsequently, and an automatic accompaniment having the one or more other drum tone colors reflected therein will be performed on the basis of the changed style data. In this manner, the one or more drum tone colors having temporarily replaced the previous or original ones are established or settled, and the thus-settled drum tone colors are reflected in the currently-performed automatic accompaniment. FIG. 16 is a conceptual diagram explanatory of correspondence or association between drum kits and performance pattern data.

A predetermined original preset drum kit DP stored in advance in the storage device 8 is associated with the performance pattern data ST (drum part) of the style data. A drum kit selected in response to user's operation on the above-mentioned tone color selection screen of FIG. 12 is temporarily associated with another preset drum kit DP than the predetermined preset drum kit DP. For that purpose, the preset drum kit DP to be associated with the drum kit selected on the tone color selection screen is copied from the storage device 8 into the edit buffer EB, and the association between the performance pattern data ST and the preset drum kit DP is changed in such a manner that the copied drum kit will be temporarily referred to. Then, by the screen display being switched over to the drum kit editing screen of FIG. 13, one or more desired drum tone colors of the drum kit, copied into the edit buffer EB, can be temporarily replaced with one or more other drum tone colors. Needless to say, when the association is not to be changed to associate the performance pattern data ST and any one of other preset drum kits DP on the tone color selection screen, it is only necessary to copy the original preset drum kit DP, associated in advance with the performance pattern data, into the edit buffer EB so that one or more desired drum tone colors of the original preset drum kit DP can be replaced temporarily.

The drum kit, having been subjected to drum tone color replacement performed in response to operation on the drum kit editing screen of FIG. 13 and waveform selection screen of FIG. 14, is copied and stored, as a custom drum kit DC, from the edit buffer EB into the storage device 8 etc., and the custom drum kit DC thus stored in the storage device 8 is formally associated with the performance pattern data ST (drum part) of the style data so that the replacement of the one or more desired drum tone colors is made permanent (established or settled). Note that, after the permanent association between the performance pattern data ST and the custom drum kit DC, it is possible to further replace one or more drum tone colors of the associated custom drum kit DC with one or more other drum tone colors.

According to the above-described embodiment of the electronic music instrument of the present invention, the drum kit editing function is assigned in advance to the "5" upward switch HB in the tone color selection screen of FIG. 12, the screen display is switched over to the drum kit editing screen of FIG. 13 in response to user's operation of the "5" upward switch HB so that one or more desired drum tone colors of a plurality of drum tone colors, defined in a drum kit allocated to the drum part, can be individually replaced with one or more other drum tone colors even during reproduction of drum-part tones (drum performance) of a predetermined performance pattern, comprising a combination of a plurality of drum tone colors, based on automatic accompaniment style data. In this way, the user can readily replace any (at least one) of the drum tone colors with another drum tone color while promptly checking an automatic accompaniment having the other drum tone color reflected therein.

Whereas one preferred embodiment of the present invention has been described with reference to the accompanying drawings, the present invention is not limited to the described embodiment and various other embodiments of the present invention are also possible.

The present application is based on, and claims priority to, Japanese Patent Application No. 2010-156996 filed on Jul. 9, 2010. The disclosure of the priority application, in its entirety, including the drawings, claims, and the specification thereof, is incorporated herein by reference.

What is claimed is:

1. An electronic music apparatus comprising:

a storage device storing a drum kit defining a combination of a plurality of drum tone colors;

a microprocessor programed to provide:

a selection task that selects automatic performance style data including at least drum performance pattern data associated with the drum kit;

a tone reproduction task of reproducing the automatic performance style data selected in the selection task so that a tone generator reproduces the automatic performance style data selected by the selection task with the drum tone colors defined by the associated drum kit; and a drum kit editing task that, in response to a user's operation edits the drum kit associated with the selected automatic performance style data by replacing at least one of the plurality of drum tone colors with another drum tone color, wherein upon the at least one drum tone color being replaced by the another drum tone color by the drum kit editing task during reproduction of the automatic performance style data by the tone reproduction task, the tone reproduction task reproduces the automatic performance style data with the another drum tone color.

2. The electronic music apparatus as claimed in claim 1, wherein the microprocessor is further programmed to provide:

a first selection task allows the user to select any of the plurality of drum tone colors as an object of tone color replacement; and a second selection task that displays a list of selectable drum tone colors and allows the user to select a desired drum tone color from the list, the drum tone color selected by the first selection task being replaceable with the drum tone color selected by the second selection task.

3. The electronic music apparatus as claimed in claim 2, wherein the microprocessor is further programmed to provide a tone generation instruction task that causes a tone corresponding to the drum tone color selected by the second selection task to be audibly generated by the tone generator for a checking purpose.

4. The electronic music apparatus as claimed in claim 3, wherein the tone generation instruction task causes the tone corresponding to the selected drum tone color to be audibly generated, in response to tone generation instructing operation by the user, by the tone generator.

5. The electronic music apparatus as claimed in claim 2, further comprising a buffer that temporarily stores information regarding the drum tone color selected the first selection task replaced with the drum tone color selected by the second selection task.

6. The electronic music apparatus as claimed in claim 1, wherein the microprocessor is programmed to further provide:

an instruction task that sets the drum tone color replacement in response to a user's operation, and a storing task that stores, once the drum tone color replacement is set by the instruction task, the drum kit having been subjected to the drum tone color replacement is in the storage device as a new drum kit different from the drum kit not yet subjected to the drum tone color replacement.

7. The electronic music apparatus as claimed in claim 1, wherein the microprocessor is programmed to further provide:

an instruction task that sets the drum tone color replacement in response to a user's operation, and a storing task that stores, once the drum tone color replacement is set by the instruction task, the drum kit having been subjected to the drum tone color replacement in the storage device by over the drum kit not yet subjected to the drum tone color replacement.

8. The electronic music apparatus as claimed in claim 1, the microprocessor is programmed to further provide a storing and associating task that stores the drum kit having the at least one drum tone color replaced with the another drum tone color in the storage device as a new drum kit different from the drum kit not yet subjected to the drum tone color replacement, and also associates the new drum kit with the performance pattern data.

9. The electronic music apparatus as claimed in claim 1, further comprising:

a display device, wherein the microprocessor is programed to further provide a display task that displays images, identifying currently-reproduced drum tone colors of the performance tones.

10. The electronic music apparatus as claimed in claim 9, wherein the display task displays on the display device each of the drum tone colors in association with a note of a keyboard and displays notes corresponding to the drum tone colors being currently reproduced.

11. A computer-implemented method of editing a drum tone color of a drum kit in an electronic musical instrument having a storage device storing the drum kit defining a combination of a plurality of drum tone colors, the method comprising:

a selection step of selecting automatic performance style data including at least drum performance pattern data associated with the drum kit;

a tone reproduction step of reproducing the automatic performance style data selected in the selection step so that a tone generator reproduces the automatic performance style data selected in the selection step with the drum tone colors defined by the associated drum kit; and an editing step of, in response to a user's operation editing the drum kit associated with the selected automatic performance style data by replacing at least one of the plurality of drum tone colors with another drum tone color, wherein upon the at least one drum tone color being replaced by the another drum tone color in the drum kit editing step during reproduction of the automatic performance style data by the tone reproduction step, the tone reproduction step reproduces the automatic performance style data with the another drum tone color.

12. A non-transitory computer-readable storage medium storing a program executable by a computer to execute a method of editing a drum tone color of a drum kit the drum kit defining a combination of a plurality of drum tone colors stored in a storage device, the method comprising:

a selection step of selecting automatic performance style data including at least drum performance pattern data associated with the drum kit;

a tone reproduction step of reproducing the automatic performance style data selected in the selection step so that a tone generator reproduces the automatic performance style data selected in the selection step with the drum tone colors defined by the associated drum kit; and an editing step of, in response to a user's operation editing the drum kit associated with the selected automatic performance style data by replacing at least one of the plurality of drum tone colors with another drum tone color, wherein upon the at least one drum tone color being replaced by the another drum tone color in the drum kit editing step during reproduction of the automatic performance style data by the tone reproduction step, the tone reproduction step reproduces the automatic performance style data with the another drum tone color.

* * * * *